Figure 1:
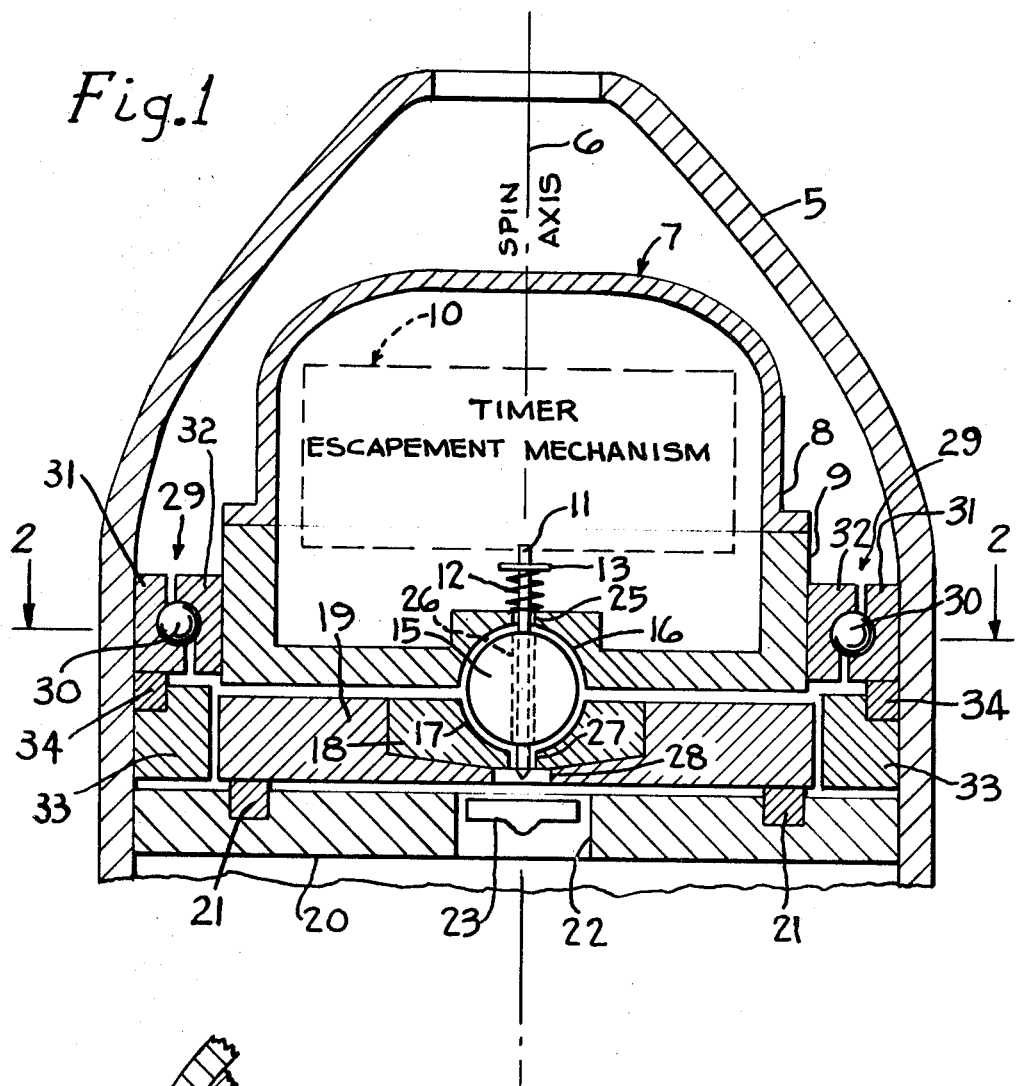

United States Patent

[11] 3,602,144

[72] Inventor  Abraham L. Korr
              Philadelphia, Pa.
[21] Appl. No. 5,456
[22] Filed     Jan. 26, 1970
[45] Patented  Aug. 31, 1971
[73] Assignee  The United States of America as
               represented by the Secretary of the Army

[54] SPIN ATTENUATOR STRUCTURE FOR MECHANICAL TIME FUZES
6 Claims, 2 Drawing Figs.

[52] U.S. Cl. .................................................. 102/84,
                                                        102/78
[51] Int. Cl. ................................................ F47c 9/04,
                                                        F47c 19/02
[50] Field of Search .................................... 102/82, 83,
                                                        84, 78, 79

[56]              References Cited
              UNITED STATES PATENTS
2,640,418  6/1953  Thompson.................   102/84
3,136,253  6/1964  Kulesza et al................  102/79

Primary Examiner—Benjamin A. Borchelt
Assistant Examiner—J. J. Devitt
Attorneys—Harry M. Saragovitz, Edward J. Kelly, Herbert Berl and S. Dubroff ABSTRACT: A cylindrical fuze housing is rotatably mounted in a shell case on the spin axis and supported by an inner or central rear ball thrust bearing on said axis and by an outer ring or annular ball bearing within the shell case. The outer ring bearing is supported by a deformable thrust ring and the rear thrust ball is likewise mounted in a housing which, in turn, is supported by a second deformable thrust ring connected with the casing. The deformable rings take up the setback shock, and the bearings provide rotational movement between the shell case and the timing mechanism of the fuze, thereby protecting it from error due to shock and rotation.

INVENTOR.
ABRAHAM L. KORR

SPIN ATTENUATOR STRUCTURE FOR MECHANICAL TIME FUZES

The invention described herein may be manufactured, used and licensed by or for the Government for governmental purposes without the payment to me of any royalty thereon.

The present invention relates to a spin attenuator structure for mechanical time fuzes and the like, which embodies a timer escapement mechanism, and has for its primary object the provision of improved means for protecting such mechanical time fuzes and the escapement mechanism thereof in projectiles against spin effects and high acceleration forces on firing. Such timer mechanisms are of the type having an escapement wheel or the like and an oscillatory escapement lever or pallet means.

In the past, mechanical time fuzes of the type referred to, when subjected to an environment which imposed a high spin thereon and resulting from being launched from a gun, suffered a degradation in timing accuracy due to a change in the frequency rate of the escapement mechanism. The cause has been traced to the deformation of the escapement spring under this environment. A number of means have been devised in the past for eliminating this defect. These include the placing of the escapement means on the axis of spin, reducing the length of the escapement spring, and the use of axially mounted coil-type escapement springs and the like.

It is therefore an important and further object of this invention to provide an improved spin attenuator system for mechanical time fuzes of the type embodying an escapement mechanism, which prevents any degradation of its timing accuracy as above referred to and which may be constructed and serviced at low cost.

In accordance with one form of the invention, a fuze housing is rotatably mounted in a shell case on the spin axis and supported by a rear thrust ball on the axis and multiball thrust type outer bearing. The latter comprises an outer annular ball race press-fitted into the shell case and abutting rearwardly against a deformable thrust ring of powdered metal, or the like, capable of absorbing heavy setback thrust or force through deformation of the ring. The outer bearing further comprises an inner annular ball race pressure-mounted on the fuze housing and a single annular row of ball bearings therein to transmit radial and axial thrust loads to the outer race or ring.

When the carrier shell case is fired, the central ball and deformable rings, one of which is under the central ball race, take up the setback shock and the ball bearings provide rotational movement relative to the shell and the fuze housing at high spin rates without imparting more than a slow rotational movement to the fuze housing. It is thus protected against setback and spin effects.

The invention will further be understood from the following description when considered with reference to the accompanying drawings, and its scope is pointed out in the appended claims.

Figure 2:
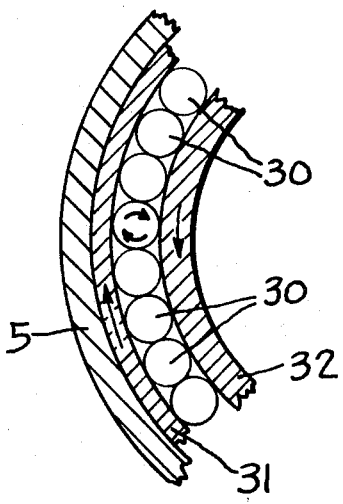

In the drawing,

FIG. 1 is a cross-sectional view, in elevation, of a spin attenuator structure for a mechanical time fuze embodying the invention, and FIG. 2 is a fragmentary top view of a section of the structure of FIG. 1, taken on the section line 2—2 thereof, showing further details of the invention.

Referring to the drawings, wherein like reference characters are applied to like parts in both figures, 5 is the outer housing of a projectile or like carrier which may be subjected to high spin rates and high setback acceleration forces, and which must be provided with a timing device in a mechanical time fuze. Thus this may be a cylindrical artillery shell case or similar projectile, and in the present example only the ogival or forward portion thereof is shown. On firing, the shell case rotates on its central axis or spin axis indicated at 6. On this axis and within the shell case is mounted a cylindrical fuze or fuze housing 7 comprising a top or cover portion 8 and cup-shaped bottom or base portion 9 providing a hollow interior within which is mounted the timer escapement mechanism therefor as indicated in dash outline at 10 and the firing mechanism which is triggered thereby and includes a firing pin 11. The latter is held, in the retracted position shown, by a coiled compression or retracting spring 12 surrounding the firing pin and operating against a washer 13 carried by the firing pin. The safing and arming means for the firing pin are not shown to simplify the drawing since such means does not concern the invention.

The cylindrical fuze housing 7 is rotatably mounted in the shell case 5 on the longitudinal or spin axis 6 mainly on a single lower or rear thrust-ball bearing 15 provided with a fixed ball bearing race 16 centrally in the bottom or rear inner end of the fuze housing base 9. An opposite and lower single ball bearing race therefor is also provided as shown at 17, being formed in a shallow circular bearing rest or block 18 in turn seated in and affixed to a circular flat carrier plate 19 of considerable mass and strength. The latter is supported near its outer periphery from a fixed transverse supporting wall 20 extending across the shell casing 5 and provided with a first deformable thrust or spacing ring 21 positioned to receive the rearward firing thrust of the fuze and timer escapement mechanism through the thrust bearing 15.

The wall 20 is provided with a central timer pocket 22 in which is located a primer or detonator 23 for the projectile. This is aligned with the firing pin 11 which extends downwardly or rearwardly through a series of clearance openings. These include a clearance opening 25 in the base 9 of the fuze casing, a central hole or opening 26 in the ball bearing 15 and a central opening 27 in the bottom or rear end of the ball-race block 18. Through these openings, the firing pin extends to a position in alignment with and spaced from the primer or detonator 23, as shown in FIG. 1. An enlarged opening 28 is provided in the supporting plate 19 to clear the firing pin over the primer or detonator 23. In the present structure, the timer mechanism 10 of the mechanical time fuze 7 operates to move the firing pin 11 and fire the detonator 23 following a predetermined time delay after the projectile is fired.

The fuze housing 7 is further supported for rotation by an outer ring or annular ball bearing of the multiple-ball type as indicated at 29. This bearing is of the combined thrust and radial type comprising a continuous ring of small ball bearing elements 30 carried between a ring-type or annular outer ball race 31 and a complementary inner ring-type or annular ball race 32. The inner ball race 32 surrounds and is tightly fixed to the outer periphery of the base 9 of fuze housing 7, and the outer ball race 31 is within the shell casing and supported against rearward thrust by a relatively heavy metal annular outer bearing supporting ring 33 tightly secured to the shell casing and radially aligned with the carrier or supporting plate 19 for the central bearing 15. In a similar manner as the supporting plate 19, the outer race 31 is supported by a deformable thrust or spacing ring of suitable material as indicated at 34. This is mounted on and secured to the rigid annular supporting ring 33 which is connected with the casing or shell case 5.

Thus the mechanical time fuze 7 with its included timer escapement mechanism 10 is freely rotatably mounted within the shell case 5 on the spin axis 6 through two separate bearings, one of which is the central thrust bearing or ball 15, and the second of which is the outer annular ring of ball elements 30 and the ball races 31 and 32 therefor. There may be called, respectively, the central rear thrust-bearing and the forward outer ring bearing. The outer race 31 is mounted in contact with the inner surface of the casing 5 and is in abutting relation to and supported rearwardly against the collapsible ring 34. This, with the ring 21, may be composed of any suitable material such as a powder metal compound capable of absorbing a considerable amount of the setback force through deformation, as will be seen from a consideration of the operation hereinafter. The inner race 32 is pressure mounted on the fuze housing as noted.

The single-ball thrust bearing 15 is of relatively large diameter and provided with the central opening or hole 26 therethrough centrally located directly over the primer or pressure point 23 and aligned with the firing pin 11 so that firing operation for the fuze 7, through the timing mechanism 10, is transmitted through the thrust bearing and into the primer or detonator along the axis of the fuze and of the shell, that is, the spin axis.

From the foregoing it will be seen that, in accordance with the invention, the cylindrical fuze housing 7 is rotatably mounted in the shell case 5 on the spin axis 6 and is supported by a single-rear thrust ball, also on the axis, and a combined thrust and radial type outer bearing 29 coaxial with the central rear thrust bearing. Both bearings are separately supported in connection with the casing through first and second deformable or crushable spacing ring elements 21 and 34, respectively, so that when the carrier casing or shell 5 is fired, the deformable rings, the first of which is under central ball race, take up the setback shock while the ball bearings provide rotational relative movement of the shell and the fuze housing.

Thus the system operates as follows: upon firing a shell from a launching element such as a rifle or a gun, the shell is rotated at high speed through the rifling and attains a high rate of spin. Simultaneously setback forces are transmitted as a result of the forward acceleration developed by high explosive pressures applied to the base of the shell and to all of the rear regions thereof. The spin and setback forces are transmitted to the outer race 31 which applies a turning movement to the balls or annular-ring ball elements 30 and exerts a rearward thrust on the spacing ring 34 which can deform to absorb the shock. The ball elements 30 apply a rotational motion to the inner race 32 and thus to the fuze housing 7 which then tends to maintain a relatively low spin rate with reference to the mechanical time fuze or timer escapement mechanism housed within it. In FIG. 2 the arrows indicate the relative motion of the two elements of the bearing 29 which permits the fuze housing to remain relatively stationary with respect to its initial reference position, due to the opposite thrust given to it by the balls 30.

The same action occurs with reference to the centrally located rear single thrust-bearing 15. The function of this central large ball is to pick up excess setback in unusually high acceleration loading conditions, such as in the firing of long range projectiles. The setback forces on the bearing 15 are transmitted to the spacing ring 21 which likewise can deform to absorb the shock. The ball also provides a pivot means for the fuze. The opening 26 in the center is to provide a means to transmit the energy of the firing pin or like firing element for effective fuze in the projectile.

Thus by this simple structure there is provided means for protecting the mechanical timer or timer escapement mechanism 10 in the fuze 7 for the projectile 5 against spin effects and the high acceleration or G forces acting upon the timing mechanism and fuze during the firing of the projectile. Such timers being of the type having an escapement wheel or the like and oscillatory escapement levers or pallet means as is known, thus are protected and operate without damaging effect on the timing rate. Thus with this system there is no appreciable change in the frequency rate of the escapement mechanism upon firing, since there is no deformation of any escapement spring under this environment, since none is used. It will thus be seen that this invention is of value in the field of timed projectiles which are launched or fired from rifled guns at high speeds for long range operation.

I wish it to be understood that I do not desire to be limited to the exact details of construction shown and described, for obvious modifications will occur to a person skilled in the art.

I claim:

1. The combination with a projectile casing having a central longitudinal spin axis, of
    a fuze therein including a timer escapement mechanism sensitive to spin and acceleration forces acting along said axis,
    a cylindrical housing for said fuze,
    an annular-ring ball bearing surrounding said fuze housing within the projectile casing,
    said ball bearing comprising a radially inner ball race connected with the fuze housing, a radially outer ball race connected with the projectile casing, and a continuous annular ring of ball elements therebetween,
    a first deformable thrust ring supporting the outer ball race in connection with said projectile casing,
    means providing a central thrust bearing for said fuze housing and including a single large thrust ball having a central opening therethrough extending along the spin axis,
    a firing pin extending through said opening in said thrust ball and along said spin axis,
    a detonator element aligned with said firing pin within said projectile casing, and
    a second deformable thrust ring supporting said thrust bearing in connection with the projectile casing.

2. The combination with a cylindrical shell casing having a central longitudinal spin axis, of
    a fuze therein including a timer escapement mechanism sensitive to spin and acceleration forces along said axis,
    a rotatable cylindrical housing for said fuze, mounted in coaxial relation to said spin axis within the forward end of said casing,
    an annular-ring ball bearing surrounding said fuze housing within the said casing,
    said ball bearing comprising a radially inner ball race connected with the fuze housing, a radially outer ball race connected with the shell casing, and a continuous annular ring of ball elements therebetween,
    a first deformable metallic thrust ring supporting the outer ball race in connection with said shell casing,
    means providing a central thrust bearing for said fuze housing and including a single larger thrust ball having a central opening therethrough extending along the spin axis,
    a spring retracted firing pin extending through said opening in said thrust ball and along said axis,
    a detonator element aligned with said firing pin within said shell casing,
    a circular carrier plate in a plane normal to the spin axis and centered thereon for holding said central thrust bearing, and
    a second deformable metallic-thrust ring supporting said thrust bearing through said carrier plate in connection with the shell casing.

3. The combination with a shell case having a central longitudinal spin axis, of
    a fuze therein including a timer escapement mechanism sensitive to spin and acceleration forces acting on the shell case along said axis on firing,
    a rotatable cylindrical housing for said fuze within and coaxial with said shell case,
    an annular thrust and radial ball bearing surround said fuze between said housing and the shell case for free rotational movement of said housing on said axis,
    said bearing comprising a radially inner ball race connected with the fuze housing, a radially outer ball race connected with the shell case, and a continuous annular ring of ball elements therebetween,
    a fixed annular supporting ring connected with the inner wall of the shell case in rear of said outer ball race,
    a first deformable metallic thrust ring directly engaging said outer ball race and seated on said thrust ring to provide a yielding supporting connection for said bearing and fuze housing within said shell case,
    means providing a central thrust bearing for said fuze housing and including a relatively large diameter single-thrust ball having a central opening therethrough extending along the spin axis,
    a firing pin operably connected with said escapement mechanism extending through said opening in said thrust ball along said spin axis,
    a detonator element aligned with said firing pin within said shell case, means providing a transversely divided central ball race for said central thrust bearing on said spin axis and connected with said shell case, and a second deformable metallic thrust ring supporting said central thrust bearing within the shell case.

4. The combination as defined in claim 2, wherein the central thrust bearing is provided with a single-ball race for the thrust ball partially in the fuze housing and partially in a circular carrier plate seated on the second thrust ring, and wherein said second thrust ring is provided with a transverse supporting wall extending across the interior of the shell case and having a central pocket for the detonator.

5. A spin attenuator structure for a mechanical time fuze, comprising in combination, a cylindrical outer carrier casing subject to high spin rates on its longitudinal axis and to high setback forces of acceleration along said axis, a fuze having a cylindrical housing rotatably mounted on said axis in said casing and having a hollow interior, a timer escapement mechanism sensitive to said spin rates and setback forces mounted on said axis in said fuze housing, an elongated firing pin connected to be actuated by said escapement mechanism and extending rearwardly therefrom along said axis in a retracted position, an outer annular ring ball bearing interposed between the fuze housing and the interior wall of said carrier casing for free rotational movement of said fuze housing on said axis within the carrier casing, said ball bearing having radially inner and outer annular ball races, an annular supporting ring for the outer ball race of said annular ball bearing attached to the inner wall of the carrier casing, a first deformable thrust and spacing ring interposed between and separating the outer ball bearing race and the supporting ring for receiving and absorbing setback forces on said annular ring bearing from said fuze housing, an inner single-ball thrust bearing for said fuze housing mounted centrally and rearwardly thereof on said axis and including a single-ball element with the firing pin extending centrally therethrough, a fixed supporting wall for said single-ball thrust bearing extending transversely across and attached to said carrier casing, a circular carrier plate for said thrust bearing supported by said wall, a second deformable thrust and spacing ring interposed between and separating said wall and carrier plate for receiving and absorbing setback forces on said thrust bearing from said fuze housing, means providing a central pocket in said transverse supporting wall, and a detonator element in said pocket aligned with and spaced from the striker end of said firing pin in said retracted position.

6. A spin attenuator structure as defined in claim 5, wherein the single ball element of the central thrust bearing is of relatively large diameter having a fixed upper ball race in the lower end of the fuze casing and a cooperating fixed lower ball race in a bearing block in the upper face of the circular carrier plate each with a central clearance opening therein for the firing pin, and wherein the outer annular ring bearing includes a continuous annular ring of relatively small ball elements and the inner and outer ball races are of the combined radial and thrust type.